United States Patent
Valles

[19]

[11] Patent Number: 5,803,291
[45] Date of Patent: Sep. 8, 1998

[54] METHOD AND ARRANGEMENT FOR POSITIONING A CONTAINER OR CONTAINER BLANK IN A PREDETERMINED ANGULAR ORIENTATION ON A CARRIER MANDREL

[75] Inventor: Thierry Valles, Etainhaus, France

[73] Assignee: Sidel, Le Harve, France

[21] Appl. No.: 564,305

[22] PCT Filed: Jun. 17, 1994

[86] PCT No.: PCT/FR94/00735

§ 371 Date: Mar. 4, 1996

§ 102(e) Date: Mar. 4, 1996

[87] PCT Pub. No.: WO95/00315

PCT Pub. Date: Jan. 5, 1995

[30] Foreign Application Priority Data

Jun. 21, 1993 [FR] France .................................. 93 07473

[51] Int. Cl.⁶ .............................. B29C 49/58; B65D 1/02; B65D 1/46
[52] U.S. Cl. .............................. 215/386; 215/40; 215/42; 425/468
[58] Field of Search .................................. 215/40, 42, 43, 215/44, 386; 264/530, 538, 540, 542; 425/468, DIG. 10, DIG. 228

[56] References Cited

U.S. PATENT DOCUMENTS

| | | | |
|---|---|---|---|
| 4,288,478 | 9/1981 | Kinoshita et al. | 215/42 X |
| 4,305,902 | 12/1981 | Uhlig | 264/340 X |
| 4,379,688 | 4/1983 | Tate et al. | 264/538 X |
| 4,649,068 | 3/1987 | Collette | 215/42 X |
| 4,711,624 | 12/1987 | Watson | 264/523 X |
| 5,366,774 | 11/1994 | Pinto et al. | 215/42 X |

FOREIGN PATENT DOCUMENTS

| | | | |
|---|---|---|---|
| 2565559 | 12/1985 | France . | |
| 1164312 | 2/1964 | Germany . | |
| 2138736 | 10/1984 | United Kingdom | 264/538 |

Primary Examiner—Sue A. Weaver
Attorney, Agent, or Firm—Sughrue, Mion, Zinn, Macpeak & Seas, PLLC

[57] ABSTRACT

A thermoplastic container or container blank having a neck (1) with a cylindrical inner wall is positioned in a predetermined angular orientation on a carrier mandrel (10) inside the neck (1), the mandrel (10) having a mandrel body (11) and a retaining member (13) actively engaging the neck (1) to secure it to the mandrel body. The retaining member (13) is freely rotatable on the mandrel body so that the neck (1) is axially secured to the mandrel body but freely rotatable thereon. A fixed abutment (14) radially projects from the mandrel body at a point thereon which is in a predetermined angular orientation and at least partially opposite a given axial portion of the inner wall of the neck (1) held on the mandrel. A radial projection (9) is at least partially located at an angularly predetermined point on the axial portion of the inner wall of the neck (1). Both the container secured to the retaining member and the mandrel body (11) are mutually rotated until the radial projection on the neck (1) engages the fixed radial abutment on the mandrel body. A positioning method involves providing such an object and mandrel, inserting the mandrel in the object's neck, and rotating the object and/or mandrel until engagement as described above.

13 Claims, 3 Drawing Sheets

U.S. Patent    Sep. 8, 1998    Sheet 2 of 3    5,803,291

METHOD AND ARRANGEMENT FOR POSITIONING A CONTAINER OR CONTAINER BLANK IN A PREDETERMINED ANGULAR ORIENTATION ON A CARRIER MANDREL

BACKGROUND OF THE INVENTION

The present invention aims to propose means—method and arrangement—making it possible to position a thermoplastic container or container blank having a neck having a substantially cylindrical axisymmetric inside wall, with a predetermined angular orientation on a carrier mandrel introduced inside the said neck, the mandrel including a mandrel body equipped with retaining means capable of interacting positively with the neck to secure the latter to the mandrel body.

The need for predetermined angular positioning of a container such as a bottle or flask or of a container blank may arise at various steps in the process for manufacturing the container from a blank or alternatively in a process for treating an already-formed container.

To focus the mind, a common, but of course nonlimiting, example relates to flasks with a flat body, of the type frequently employed for certain household cleaning products, which are equipped with a trigger-operated spray device screwed onto the neck: it is therefore desirable, to reduce the bulk, for the spray device to be located on the neck such as to extend parallel to the largest dimension of the body of the container. This results in the need, during the manufacture of the body of the container (by blow molding or stretch blow molding of an axisymmetric cylindrical blank), for the direction of greatest deformation of the body of the original blank (and leading to the largest dimension of the flattened body of the final container) to be positioned angularly in a precise manner with respect to the start of the screw thread of the neck (which neck is at its final dimensions as soon as it has been manufactured by injection molding of the blank). In this context, there are therefore grounds for angularly positioning the blank in a precise and predetermined manner on the mandrel called upon to carry it.

SUMMARY OF THE INVENTION

The object of the invention is therefore essentially to propose means—method and arrangement—making it possible to give a container or container blank the required predetermined angular positioning on a carrier mandrel, preferably making sure that, as far as possible, the means in question lead only to minimum modifications of the machines so that it may be possible for already-existing machines easily to be equipped with the means of the invention.

To these ends, according to a first of its aspects, the invention proposes a method for positioning a thermoplastic container or container blank having a neck having a substantially cylindrical axisymmetric inside wall, with a predetermined angular orientation on a carrier mandrel introduced inside the said neck, the mandrel including a mandrel body equipped with retaining means capable of interacting positively with the neck to secure the latter to the mandrel body, which method, established in accordance with the invention, is essentially characterized in that:

the said retaining means are mounted so that they can rotate freely on the body of the mandrel such that the neck is axially secured to the mandrel body but free to rotate thereon, a fixed stop is provided, projecting radially from the body of the mandrel and which is located at a point thereof which has a predetermined angular orientation and which is situated, at least in part, opposite a given axial portion of the internal wall of a neck mounted on the mandrel and retained thereon by the aforementioned retaining means, a radial projection is provided, located, at least in part, at an angularly predetermined point of the aforementioned axial portion of the internal wall of the neck, and a relative rotational movement between the container or blank secured to the retaining means and the body of the mandrel is brought about until the radial projection of the neck comes to bear against the fixed radial stop of the body of the mandrel, by virtue of which the container or blank is brought onto and retained on the mandrel with a predetermined angular orientation with respect to the body of the mandrel.

In the common case of an installation for manufacturing or processing containers as they progress, in which installation each mandrel is mobile and displaced parallel to itself (transfer chain) at the same time as it is given a rotation on itself, provision is advantageously made according to the invention that once the retaining means have engaged positively with the neck, the rotational movement of the neck on itself is braked, leaving the mandrel body free in its rotational movement on itself in order to obtain the aforementioned relative rotational movement bringing the radial projection of the neck to bear against the fixed radial stop of the mandrel body.

In a particularly attractive embodiment, the retaining means consist of a radially elastically deformable split ring which is engaged so that it can rotate freely in an annular groove hollowed out from the body of the mandrel. Such a split ring is generally already present on the mandrels of currently existing installations and serves as a blocking means for securing the neck—and the container or blank—to the mandrel. However, in current installations, the ring is prevented from rotating (for example by the presence of a key in the retaining groove) so that the container or blank is secured to the mandrel both axially and in terms of rotation. In these conditions, the method of the invention —whether dealing with the manufacture of new machines or with the re-fitting of already-existing machines—is put into practice in a technically simple fashion by freeing the elastic ring and by providing a fixed stop at a chosen point on the body of the mandrel.

According to a second of its aspects, the invention proposes an arrangement for positioning a thermoplastic container or container blank having a neck having a substantially cylindrical axisymmetric inside wall, with a predetermined angular orientation on a carrier mandrel introduced inside the said neck, the mandrel including a mandrel body equipped with retaining means capable of interacting positively with the neck to secure the latter to the mandrel body, which arrangement, structured in accordance with the invention, is essentially characterized in that:

the said retaining means are mounted so that they can rotate freely on the body of the mandrel such that the neck is axially retained on the mandrel body but free to turn thereon;

a fixed stop projects radially from the mandrel body, at a point thereon which has a predetermined angular orientation and, at least in part, is opposite a given axial portion of the internal wall of a neck mounted on the mandrel and retained thereon by the aforementioned retaining means;

a radial projection is located, at least in part, at an angularly predetermined point of the aforementioned axial portion of the internal wall of the neck; and means are capable of bringing about a relative rotational movement between the container or container blank retained by the retaining means and the body of the mandrel such as to bring the radial projection of the neck to bear against the radial stop of the body of the mandrel, by virtue of which the container or container blank may be retained on the mandrel with a predetermined angular orientation with respect to the body of the mandrel.

For preference, in an installation for manufacturing or for treating containers as they progress, in which installation each mandrel is mobile and displaced in translation parallel to itself at the same time as it is set in rotation on itself, provision is made that the aforementioned means capable of bringing about a relative rotational movement between the container or container blank and the mandrel body are constructed in the form of friction means (for example a friction pad located in the installation laterally and bordering the path followed by the blank or the container) capable of rubbing on the container or container blank in order to brake the rotational movement thereof while the mandrel body continues to be driven freely in rotation.

Very advantageously, the retaining means comprise a radially elastically deformable split ring retained so that it can rotate freely in an annular groove of the mandrel body.

In a preferred embodiment, the radial projection of the neck is shaped in the form of a rib extending longitudinally along the internal wall of the neck and the fixed stop of the mandrel body is located such as to interact with the end of the said rib closest to the orifice of the neck. Advantageously, in this case, to obtain good centering of the mandrel introduced into the neck, the internal wall of the neck is provided with several longitudinal ribs projecting radially, a specific one of these ribs has a length greater than the length of the other rib or ribs in the direction of the orifice of the neck and the fixed stop of the body of the mandrel is situated opposite the longest part of the said specific rib; it is thus contrived that the fixed stop of the body of the mandrel is situated on that part of the mandrel body which is, with respect to the groove accommodating the freely rotating ring, opposite the free end of the mandrel.

To be sure of the desired centering of the mandrel introduced inside the neck, the ribs are at least three in number and, desirably, they are uniformly spaced apart.

BRIEF DESCRIPTION OF THE DRAWINGS

The invention will be better understood from reading the detailed description which follows of a preferred one of its embodiments, given merely by way of nonlimiting example. In this description, reference is made to the appended drawings in which.

DETAILED DESCRIPTION OF THE PREFERRED EMBODIMENTS

Figure 1:
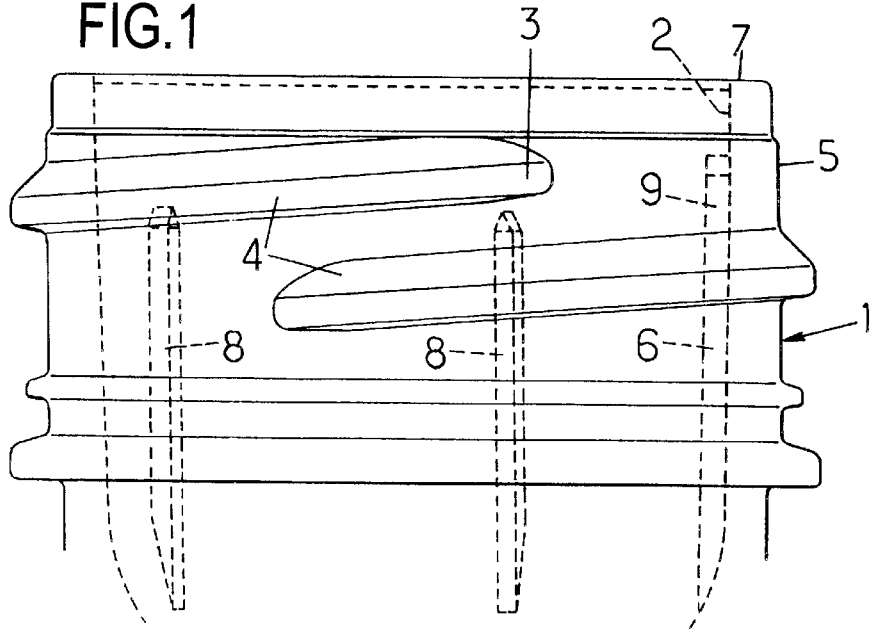
FIGS. 1 and 2 are views respectively from the side and from above of a container or blank neck arranged in accordance with the invention.
Figure 2:
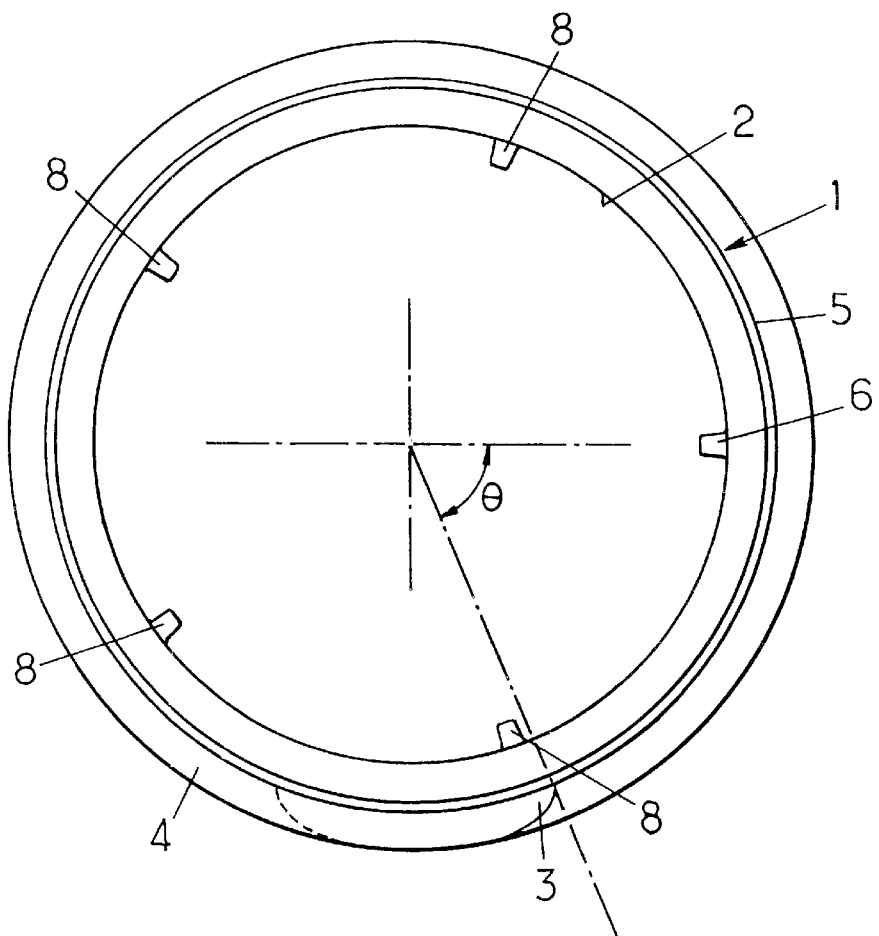
Figure 5:
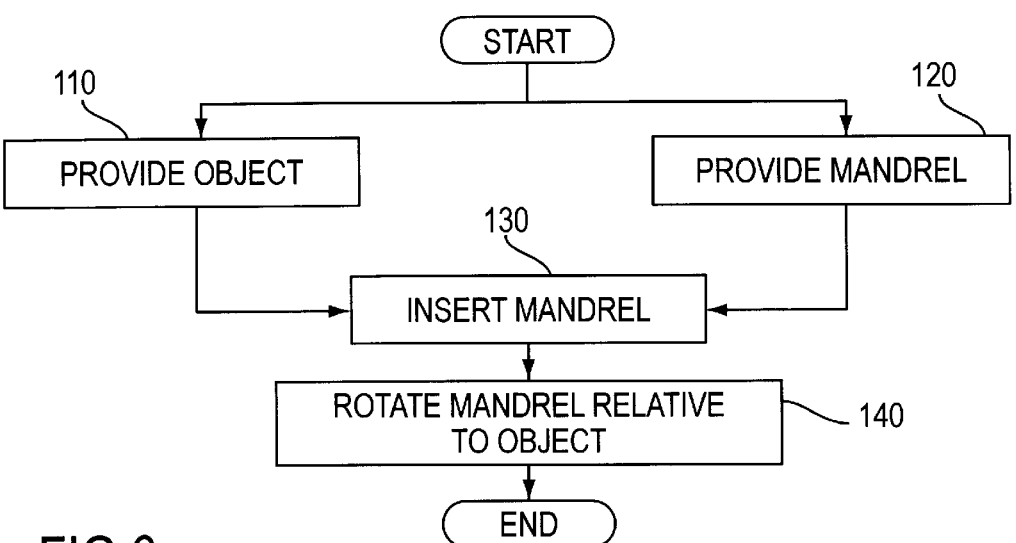
FIG. 5 is a flow diagram showing an embodiment of the invention.

Referring first of all to FIGS. 1 and 2, and 5, a neck 1 of a thermoplastic container (flask, bottle, . . . ) or container blank has a substantially cylindrical axisymmetric internal wall 2 (see FIG. 5, step 110).

At a predetermined point (for example, to illustrate what was explained earlier, at a predetermined angular distance θ from the start 3 of a screw thread 4 provided on the external wall 5 of the neck 1 to take, at a later stage, a screw-on stopper or accessory) of the internal wall 2 there is provided a radial projection 6 which is advantageously in the form of a rib extending substantially parallel to the axis of the neck. Its radial thickness may be relatively small (for example 0.8 mm) and it extends as far as a small distance (for example 2.5 mm) away from the edge of the orifice of the neck.

To obtain good centering of the carrier mandrel—dealt with later—which is to be introduced into the neck 1, other projections 8, also in the form of ribs and distributed around the periphery of the internal wall 2 are provided. To ensure the required centering, the ribs 6 and 8 total at least three in number (five in the example represented in FIGS. 1 and 2), evenly separated from each other. However, it will be observed that the ribs 8 are shorter than the first rib or specific rib 6 and their upper end is situated at a greater distance (for example 4.5 mm) from the edge 7 of the orifice of the neck.

In this arrangement, the specific rib 6 has a terminal part 9 which alone is situated in a given axial portion of the internal wall of the neck and whose role will be explained later.

Figure 3:
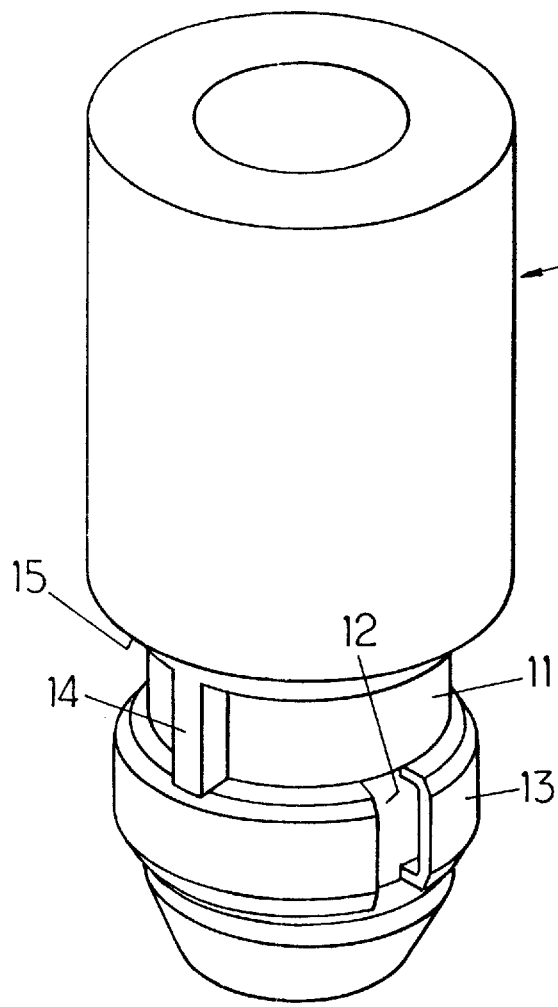
FIG. 3 is a view in perspective of a mandrel arranged in accordance with the invention.
Figure 7:
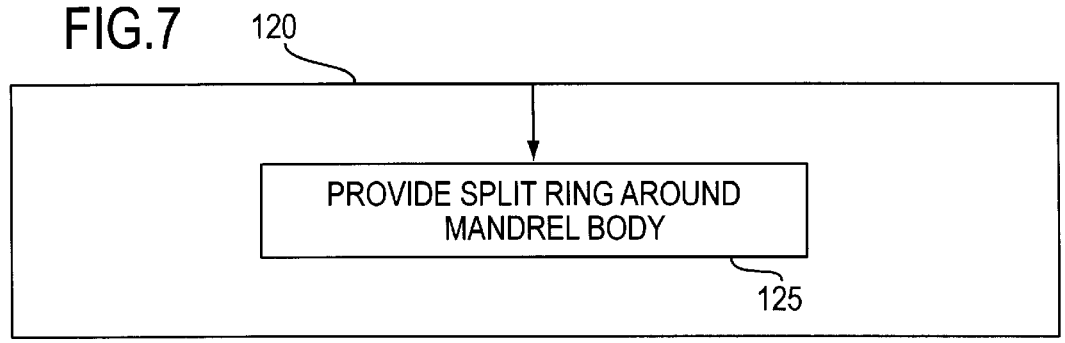
FIG. 7 is a lower level flow diagram showing another more specific embodiment of the invention with respect to a different one of the steps in FIG. 5.

FIG. 3 represents a mandrel 10 (see FIG. 5, step 120) which has a mandrel body 11 equipped with an annular groove 12 inside which there is housed, so that it can rotate freely, a split ring 13 which is elastically deformable in the radial direction (see FIG. 7, step 125); the external diameter of this undeformed ring is substantially greater than the external diameter of the mandrel body 11 and than the internal diameter of the neck 1, the external diameter of the mandrel body 11 for its part being substantially identical to or not much less than the internal diameter of the neck 1.

At an angularly predetermined point on the mandrel body 11 and at least in a predetermined axial portion of the mandrel body, in this case above (in FIG. 3) the groove 12 (that is to say on that part of the mandrel body which is situated, with respect to the groove 12, opposite the free end of the mandrel body), there is provided a radially projecting stop 14.

Figure 4:
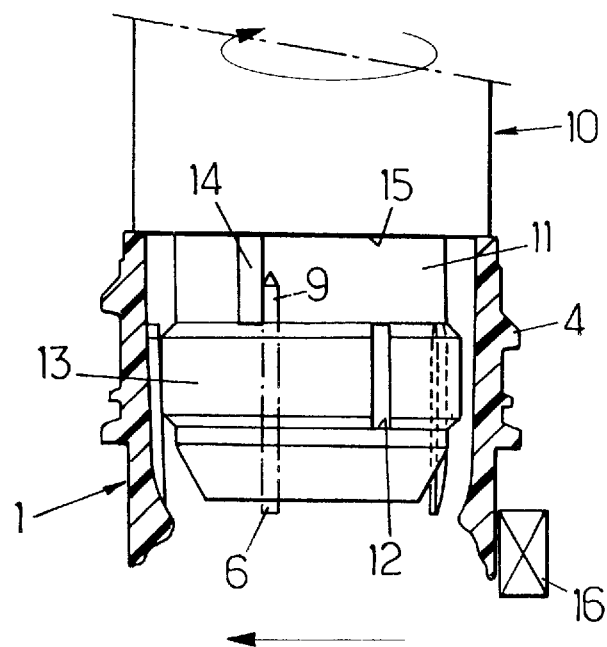
FIG. 4 is a view from the side, in section, illustrating the predetermined angular positioning of the neck of FIGS. 1 and 2 on the mandrel of FIG. 3.

In the practical case of an installation for manufacturing or processing containers as they progress, a transfer chain is provided which is equipped with a plurality of mandrels, each mandrel being displaced in translation parallel to itself (see FIG. 4, lower arrow) at the same time as it is given a rotational movement on itself (see FIG. 4, upper arrow). All these known means are not shown in FIG. 3.

FIG. 4 shows the mandrel 10 introduced inside the neck 1 (in practice, the container or blank is offered up below the mandrel which is lowered to be introduced into the neck— "donning" operation) until the edge 7 of the orifice of the neck 1 butts up axially against an annular shoulder 15 of the body of the mandrel 10 (see FIG. 5, step 130). The deformable ring 13 bears on the longitudinal ribs 6 and 8 and thus retains the neck 1 on the mandrel 10 in a centered position. The stop 14 of the mandrel body and the upper part 9 of the specific rib 6 of the neck 1 are therefore in respective axial portions of the external surface of the body of the mandrel and the internal surface of the neck which are substantially at the same level and which face each other.

It is then easy to make the container or blank 1 turn around the mandrel body 11 (see FIG. 5, step 140), because the only intermediate member securing them axially together is the ring 13 which can turn freely in its retaining groove 12. This rotation takes place until the upper part 9 of the specific rib 6 comes to bear against the stop 14 of the mandrel body 11, as represented in FIG. 4. The blank or container 1 is then located in a predetermined angular position with respect to the mandrel body 11, and therefore with respect to the rest of the installation in which the mandrel 10 always has a known position by virtue of angular-position indexing means which are known per se.

Figure 6:
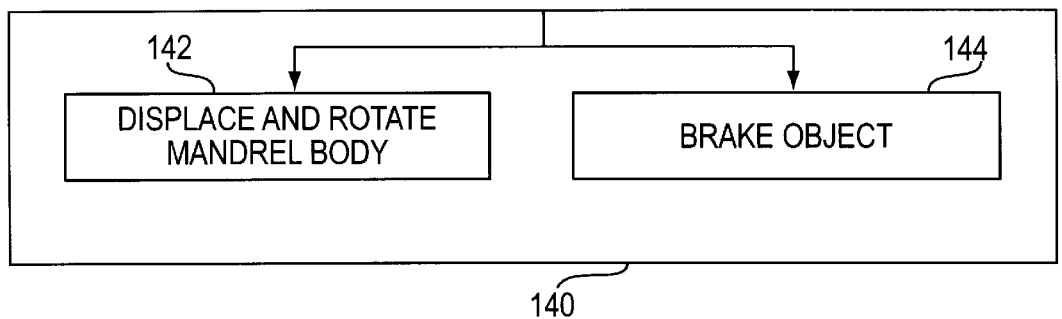
FIG. 6 is a lower level flow diagram showing a more specific embodiment of the invention with respect to one of the steps in FIG. 5.

In practice, in a transfer chain including a plurality of mandrels in succession, the relative rotation of the container or blank with respect to the mandrel body may be obtained in a simple manner by braking (see FIG. 6, steps 142 and 144) the container as the transfer chain advances: to this end, for example a friction pad 16 arranged laterally and capable of rubbing against any suitable part of the body or of the neck of the blank or of the container may be provided.

It will be understood that the means employed within the context of the present invention are technically simple and require only a minimum adaptation to already-existing mandrels together with the fitting of a brake pad, all these being modifications which can relate not only to new installations but also be made without difficulty in already-existing installations.

As goes without saying and as moreover already results from the foregoing, the invention is in no way limited to those of its applications and embodiments which have been envisaged more specifically; on the contrary, it encompasses all variants thereof.

I claim:

1. A system for positioning a thermoplastic neck at a predetermined angular orientation comprising:
   a thermoplastic object selected from the set consisting of a thermoplastic container and a thermoplastic container blank, said thermoplastic object comprising a neck having a substantially cylindrical axisymmetric inside wall, said neck including a given axial portion and a radial projection disposed, at least in part, at an angularly predetermined point of said given axial portion of said inside wall;
   a carrier mandrel, including a mandrel body, a free end, means for securing said neck to said mandrel body, and a fixed stop projecting radially from said mandrel body and defining said predetermined angular orientation, said means for securing being freely rotatable on and axially secured to said mandrel body, said free end of said carrier mandrel being positioned inside said neck so that said means for securing secures said neck at said given axial portion of said neck; and
   means for causing a relative rotational movement between said mandrel body and said thermoplastic object so that said radial projection of said neck bears against said fixed stop of said mandrel at said predetermined angular orientation.

2. The system according to claim 1, further comprising:
   said relative rotational movement between said mandrel body and said thermoplastic object being performed by laterally displacing and rotating said mandrel body;
   said means for causing said relative rotational movement comprising means for rubbing against said thermoplastic object to brake the rotational movement thereof; and
   said means for rubbing braking said thermoplastic object during said relative rotational movement.

3. The system according to claim 1, wherein said means for securing comprises a split ring that is radially elastically deformable, disposed around an annular groove of said mandrel body.

4. The system according to claim 3, wherein said annular groove is closer to said free end of said carrier mandrel than said fixed stop.

5. The system according to claim 1, further comprising:
   said neck including ribs extending longitudinally along said inside wall toward an orifice edge of said neck;
   said radial projection being a specific one of said ribs extending closest to said orifice edge; and
   said fixed stop of said mandrel body interacting with an end of said specific rib.

6. The system according to claim 5, wherein said carrier mandrel, prior to said relative rotational movement, is positioned inside said neck with said fixed stop opposite said specific rib.

7. The system according to claim 6, wherein said ribs are at least three in number.

8. The system according to claim 6, wherein said ribs are uniformly spaced apart.

9. A thermoplastic object, comprising:
   a thermoplastic neck having a substantially cylindrical axisymmetric inside wall, said neck including a given axial portion and a radial projection disposed, at least in part, at an angularly predetermined point of said given axial portion of said neck, said neck including ribs extending longitudinally along said inside wall toward an orifice edge of said neck, said radial projection being a specific one of said ribs extending closest to said orifice edge.

10. The thermoplastic object according to claim 9, wherein said thermoplastic object is one of a thermoplastic container blank for making a thermoplastic container, and a thermoplastic container.

11. A method for positioning a thermoplastic object at a predetermined angular orientation comprising:
    providing said thermoplastic object selected from the set consisting of a thermoplastic container and a thermoplastic container blank, said thermoplastic object having a neck with a substantially cylindrical axisymmetric inside wall, including a given axial portion thereof, and a radial projection disposed, at least in part, at an angularly predetermined position of said given axial portion of said inside wall;
    providing a carrier mandrel, including a mandrel body, a free end, means for securing said neck to said mandrel body, and a fixed stop projecting radially from said mandrel body and defining said predetermined angular orientation, said means for securing being freely rotatable on and axially secured to said mandrel body;
    inserting said free end of said carrier mandrel inside said neck so that said means for securing secures said neck at said given axial portion;
    providing means for rotating said mandrel body relative to said thermoplastic object; and
    rotating said mandrel body relative to said thermoplastic object until said radial projection of said neck bears against said fixed stop of said mandrel at said predetermined angular orientation.

12. The method according to claim 11 further comprising providing means for braking said thermoplastic object, wherein said rotating step includes laterally displacing said mandrel body and, at the same time, braking said thermoplastic object.

13. The method according to claim 11, wherein step of providing a carrier mandrel includes providing, as said means for securing, a split ring that is radially elastically deformable, disposed around an annular groove of said mandrel body.

* * * * *